Feb. 28, 1950   W. L. SHEPPARD   2,498,828
TRANSMISSION GEARING
Filed July 1, 1943
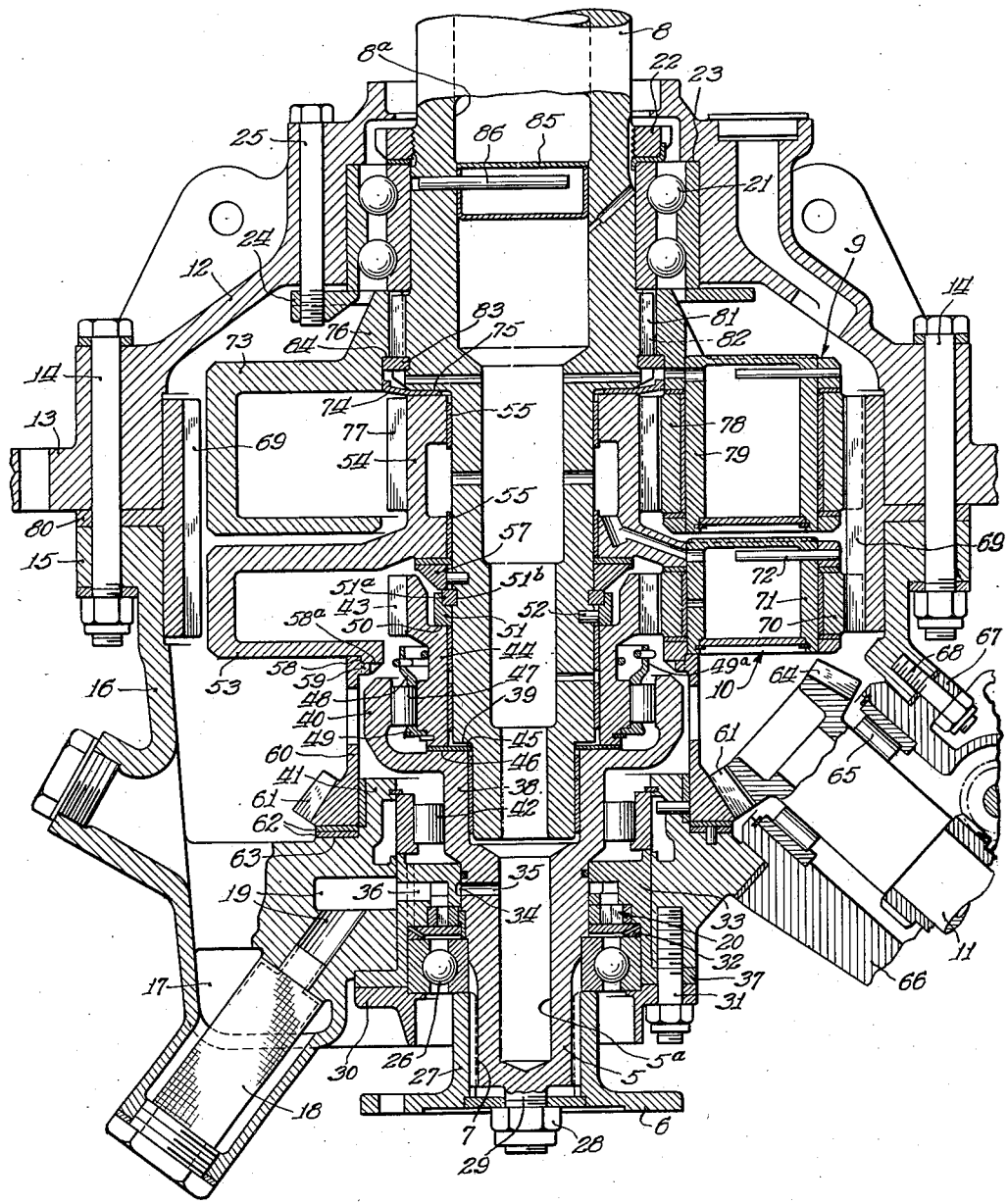
Inventor:
William L. Sheppard
By: Edward C. Fitzhaugh
Atty.

Patented Feb. 28, 1950

2,498,828

UNITED STATES PATENT OFFICE 2,498,828

TRANSMISSION GEARING

William L. Sheppard, Royal Oak, Mich., assignor to Borg-Warner Corporation, Chicago, Ill., a corporation of Illinois Application July 1, 1943, Serial No. 493,012

7 Claims. (Cl. 74—801)

1

The present invention relates to transmission gearing, and it has for its principal object to provide a desired ratio of reduction in a gearing that is adapted to be employed for driving and driven shafts having normally vertical, preferably alined axes.

Also, it is an object of this invention to provide instrumentalities in a transmission gearing whereby the rotational movement of the axially alined drive and driven shafts is adapted to be effectively transmitted to a supplementary or auxiliary shaft that may be disposed at an angle to said shafts. A transmission gearing structure such as above suggested is especially applicable for use in a helicopter for actuating both the sustaining rotor and the tail rotor or stabilizing propeller thereof.

It is one of the principal objects of this invention to simplify the construction of a transmission gearing of the character contemplated herein, and to improve the efficiency and operation of such gearing.

Another object is to provide a gearing of the character above-mentioned wherein the power take-off of the lateral or auxiliary shaft is made direct from a portion of the carrier for a planetary gear train assembly which comprises a part of the transmission structure. A further object resides in the particular disposition of the auxiliary shaft gears so that they are in spaced relation to the planetary gear train assembly from which the aforesaid auxiliary shaft gears derive their motion, thereby permitting the use of the best gear ratio without unduly increasing the size and weight of the transmission.

It is a still further object to provide an efficient lubrication system for the various instrumentalities which surround the vertically disposed shafts, the system utilizing a minimum of drilled passageway in the transmission housing, and in connection therewith to provide a pump to force the lubricant to different locations. The pump is a concentrically disposed structure surrounding the drive shaft, and it is preferably immersed in the oil in a sump or oil-reservoir near the lower end of the housing.

In the transmission gearing structure which is contemplated herein, the end thrust which is developed in the gearing is adapted to balance at least a portion of the upward thrust of the driven shaft, which will result in smaller bearing loads and less wear on the moving parts.

Additional objects, aims, and advantages of the present invention will be apparent to persons skilled in the art after the construction and operation of the transmission gearing is understood from the description which follows.

It is preferred to accomplish the numerous objects of this invention and to practice the same in substantially the manner hereinafter fully described and as more particularly pointed out in the appended claims, reference being made to the accompanying drawings which form a part hereof.

The figure is a vertical axial section of a transmission gearing embodying this invention, the structure shown being one that is adapted for use in a helicopter or similar aircraft.

The form of this invention which is shown in the drawing embodies a typical arrangement of the instrumentalities for carrying out this invention, and it preferably embodies a vertical drive-shaft 5 that is axially bored at 5a and has an annular flange 6, secured to its lower end by means of the spline 7, through the medium of which the drive-shaft derives its rotative motion from the prime mover (not shown) of the helicopter. The motor may be operatively connected to said flange 6 by means of a suitable clutch (not shown). Above the drive-shaft 5 there is a driven-shaft 8 that is axially bored at 8a and is disposed with its axis in vertical alinement with said drive-shaft. This driven-shaft 8 extends above the body of the helicopter and is adapted to actuate the sustaining rotor of the aircraft.

Interposed between and operatively connecting the alined driving and driven shafts there is a two-stage reduction gearing which provides a high ratio reduction drive connection between said shafts, and it preferably comprises upper and lower epicyclic or planetary gear train assemblies of the helical type which are identified generally as 9 and 10 respectively. The auxiliary shaft 11 for the tail rotor or stabilizer propeller is shown with its axis inclined downwardly from the axes of the main shafts 5 and 8, and it has its power take-off from the lower epicyclic or planetary gear train assembly 10 from which it is suitably spaced.

The transmission gearing is enclosed in a two-part housing, the upper member 12 of which has a generally conical shape and is provided with an annular basal flange 13 having a plurality of bored lugs to receive clamping bolts 14 which pass through the upper annular flange 15 of the other member 16 of the housing. An oil sump 17 is formed in the bottom of the housing member 16 wherein there is a cylindrical filter 18, and there is a passageway 19 leading from the filter chamber to a suitable pump structure 20 that is of annular shape and concentrically surrounds the lower or drive-shaft 5 within the housing.

The upper member 12 of the housing is supported on the driven shaft 8 through the instrumentality of the large double ball-bearing 21, the inner raceway of which bears against a collar 22 threaded onto the adjacent portion of the driven shaft 8, and the outer raceway of this ball-bearing engages a shoulder 23 in the upper portion of the housing member. An annular disc 24, which is engaged with the lower edge of the outer raceway, holds the latter in position by means of clamping bolts 25 which pass through the housing and disc to draw these parts together and force the outer raceway against shoulder 23. The drive-shaft 5 is journaled in a large ball-bearing 26 which has its inner raceway resting upon the upper end of the hub 27 of the coupling flange 6, the said flange being held fast on the drive-shaft by a nut 28 screwed onto the threaded reduced lower end 29 of said shaft. The outer raceway of the ball-bearing 26 has its lower edge engaged with a flanged retainer ring 30 which is secured to the under side of the housing member 16 by bolts 31, and the upper edge of said raceway engages a flanged washer 32 that is interposed between it and the adjacent portion of the oil pump 20. The ball bearing 26, the pump 20, and the intermediate flanged washer 32, are disposed in superposed relation to each other in a collar 33 having a shouldered or stepped bore to seat these elements, and the narrowest portion of this bore, which is engaged with the drive-shaft 5, has an annular channel 34 communicating with the pump 20. The adjacent portion of the driveshaft has a lateral passage 35 whereby the lubricating fluid from the pump is discharged into the bore 5a of the drive-shaft for distribution throughout the parts of the transmission. A radial passage 36 in the collar 33 establishes communication between the pump and passageway 19 from the filter chamber in the oil-sump or reservoir, and an annular flange 37 on the lower portion of the collar 33, which is clamped between the lower end of the housing member 16 and the retainer ring 30, maintains the collar 33 in position.

Above the collar 33, the drive shaft 5 has a portion of increased diameter as at 38 to receive and pilot the lower end of the driven shaft 8 which has a shoulder 39 above its piloted portion, and the upper end of the drive shaft terminates in an outwardly and upwardly flared bell 40. The central lower portion of the housing member 16 is provided with an annular upstanding hollow stub 41 concentric to the drive shaft 5 and spaced from said shaft alongside the widened portion 38 thereof below the bell 40, and a roller bearing 42 is interposed between said stub 41 and the drive shaft 5 for journaling the latter.

The sun-gear 43 of the lower planetary gear train assembly 10 is provided with an elongated hub 44 surrounding the adjacent portion of driven shaft 8 upon which it is journaled to permit it to rotate independently thereof, and said hub 44 extends down into the bell 40 of the drive shaft far enough to permit its lower end to rest upon a washer 45 that is interposed between it and the flat lateral face 46 of said bell, thereby providing support for said sun gear 43. The concentrically disposed confronting faces of the drive shaft bell 40 and the sun gear hub 44 comprise the opposing or wedging elements of a oneway or freewheeling clutch device, the said elements being adapted to be releasably connected by a plurality of rollers 47 that provide the operative elements of said clutch. These clutch rollers 47 are maintained in position by upper and lower portions 48 and 49, respectively, of a roller cage 49a. The one-way or freewheeling clutch is adapted to operatively connect the drive shaft 5 to the sun gear 43 of the lower planetary gear train assembly 10 to rotate said sun gear 43 with, and at the same speed as, the drive shaft 5 of the transmission.

The upper portion of the sun gear 43 above its hub is cupped to provide a shoulder 50 against which a retaining washer 51 is seated, the said washer being restrained against upward displacement by a snap ring 51a fitted into an annular groove 51b in the adjacent face of the driven shaft 8, and rotation of said washer is prevented by a stop pin 52 projecting from the shaft into a transverse slot in the inner face of the washer. The structure which has just been described is adapted to assist in rendering the end thrust produced by the helical gears self-contained in the driven shaft 8.

The gear train elements of the lower planetary assembly 10 are supported by a hollow carrier 53 that has an upwardly disposed hub 54 surrounding the driven shaft 8 above the carrier 53, said hub being journaled on said shaft in bushings 55 to permit it to rotate independently thereof. The lower portion of hub 54 rests upon a bushing interposed between it and a stationary washer 57 surrounding the driven shaft and supported upon the snap ring 51a. This arrangement provides the upper support and bearing for the lower carrier 53.

The lower wall of the carrier 53 is provided with a shoulder 58 on which are formed downwardly projecting teeth 58a that interengage with corresponding teeth 59 on the inner surface of a cylindrical hollow sleeve 60. The top of this sleeve is centered on shoulder 58 of carrier 53 and its lower portion surrounds and is journaled against the annular stub 41 of the lower housing member 16. The lower end of this sleeve 60 is provided with a bevel gear 61 that is rotatably supported by washers 62 on an annular bearing surface 63 alongside and surrounding the stub 41.

As will be seen at the right side of the drawing, the beveled gear 61 provides the power take-off for the auxiliary shaft 11 through the instrumentality of a beveled gear 64 that is suitably secured to the adjacent end of said shaft. The auxiliary shaft structure is rotatably journaled in roller bearings 65 in the adjacent end of a hollow casing 66 that has an annular flange 67 at its upper end whereby said end may be inserted in an opening in the housing member 16 and anchored to the latter by bolts 68 passed through the flange and screwed into the wall of the housing. The beveled gear 64 is thus conveniently located between the carrier 53 and bevel gear 61 with the result that the desired ratio between the speeds of shafts 5 and 11 can be readily attained without the use of disproportionate gears and an undesirably large housing, and with the desired angularity between shafts 5 and 11.

The lower planetary gear train, which includes the sun gear 43, embodies a wide ring gear 69 and a plurality of planet gears 70 that are journaled on hollow trunnions 71 mounted in the top and bottom walls of the carrier 53. The trunnions are of substantial diameters and are secured in the carrier by pins 72, suitable bearing bushings, and washer being interposed between said gears, their respective trunnions, and the adjacent surfaces of the carrier walls.

The before-mentioned hub 54 of the lower carrier 53 projects into the upper carrier 73, with its upper end engaged with a washer 74 that is interposed between said end and a shoulder 75 on the driven shaft 8, and said carrier 73 is provided with an upstanding tapered hub 76 that engages the lower portion of the large double ball-bearing 21.

The upper gear-train comprises a sun gear 77 preferably formed on the lower carrier hub 54, a plurality of planet gears 78 rotatably mounted on trunnions 79, and the wide ring gear 69. This ring gear 69 is of sufficient width to mesh with the planet gears 70 of the lower epicyclic assembly 10, as well as with the planet gears 78 of the upper assembly 9, so that it is therefore common to both assemblies and provides the fulcrum for the torque multiplication produced by the two-stage planetary gearing of the transmission. The planet gears and the trunnions of these two gear train assemblies have their axes all in the same concentric plane with respect to the axes of the drive and driven shafts. The outer face of the ring gear 69 fits against the cylindrical inner surfaces of the housing members 12 and 16, and it has an outer annular flange or rib 80 that is disposed between the proximate edges of said housing members where it is anchored by means of the bolts 14 that secure the housing together.

The power take-off for the driven shaft 8 is accomplished through the medium of external splines 81 on the driven shaft above the shoulder 75, which engage internal splines 82 on the inner portion of the upper carrier hub 76. A heavy ring 83 seats in an annular groove in the driven shaft and supports the upper carrier by engaging the underside of a shoulder 84 on the tapered hub 76 beneath the internal gear 82.

It will be noted that the drive and driven shafts 5 and 8 are hollow, and that the driven shaft is provided with a plurality of lateral ports, so that, when the transmission is in operation, the pump 20 will force the lubricant into the bores of these shafts for distribution through said ports to the various moving parts of the structure. A hollow plug 85 fits into the bore of driven shaft 8 and is secured in place by a pin 86 to act as a stop to arrest the upward flow of the lubricant at a level in said shaft above the upper port.

In the operation of this transmission, the rotation of drive shaft 5 is transmitted through the one-way clutch to the lower sun gear, which will actuate the lower gear train assembly 10 and revolve its carrier 53 at a slower speed than the drive shaft. The upper sun gear 77, which is on said carrier 53 and rotates with it, will transmit this rotative motion through the upper gear train assembly 9 (which will be moving at a slower speed than the lower assembly 10) to the internal gear 82 in mesh with gear 81 on the driven shaft 8, so that further or second reduction in speed is accomplished.

While I have disclosed my invention in connection with certain specific embodiments thereof it is to be understood that this is by way of illustration and not by way of limitation and the scope of my invention is defined solely by the appended claims which should be construed as broadly as the prior art will permit.

I claim:

1. A transmission gearing adapted for operation on a vertical axis, embodying co-axial drive and driven shafts, a planetary gear train assembly, including a planet gear carrier, drivingly connecting said shafts; an auxiliary shaft independent of said drive and driven shafts, a bevel gear spaced from the carrier of said planetary gear assembly and actuated thereby, and a bevel pinion operating in the space between said bevel gear and said carrier, said pinion being connected to and actuating said auxiliary shaft.

2. A transmission gearing adapted for operation on a vertical axis, embodying co-axial drive and driven shafts, a planetary gear train assembly, including a planet carrier, drivingly connecting said shafts; an auxiliary shaft independent of said drive and driven shafts, a sleeve depending from and centered on the carrier of said planetary gear assembly, a bevel gear on the lower portion of said sleeve in spaced relation to the carrier, and a bevel pinion operating in the space between said bevel gear and carrier, said pinion being connected to and actuating said auxiliary shaft.

3. A transmission gearing adapted for operation on a vertical axis, embodying co-axial drive and driven shafts; a planetary gear train assembly, including a planet gear carrier, having drive connection with said driven shaft; a one-way clutch operatively connecting the drive shaft to the planetary gear assembly, an elongated sleeve depending from the carrier of the planetary gear assembly and telescoped over said clutch, a bevel gear on the lower portion of said sleeve in spaced relation to the carrier, a bevel pinion meshed with said bevel gear and operating in the space between said bevel gear and the carrier, and an auxiliary shaft connected to and actuated by said bevel pinion.

4. A transmission gearing for operation on a vertical axis, embodying co-axial drive and driven shafts, one of said shafts being piloted on the other shaft, upper and lower planetary helical gear train assemblies around the driven shaft, said upper gear train including a sun gear, a shoulder on said driven shaft, and a thrust washer on the driven shaft below said shoulder, the sun gear of the upper helical gear train being disposed between said thrust washer and shoulder to cause the end thrust of the helical teeth of the gear train to be taken on the driven shaft.

5. A transmission gearing for operation on a vertical axis, embodying co-axial drive and driven shafts, one of said shafts piloted on the other shaft, upper and lower planetary helical gear train assemblies around the driven shaft, each of said assemblies including a sun gear, the sun-gear of the lower helical gear train being mounted on the driven shaft and supported against longitudinal movement by the drive shaft and rotated thereby, a retainer ring engaged with the upper portion of said sun-gear, a shoulder on said driven shaft, and a thrust washer below said shoulder and maintained in position by said retainer ring, the sun-gear of the upper helical gear train being interposed between the thrust washer and said shoulder to cause the end thrust of the helical teeth of the gear train to be taken on the driven shaft.

6. A transmission gearing for a helicopter and similar aircraft, embodying co-axial drive and driven shafts, upper and lower planetary helical gearing, including a sun gear for said lower gearing, operatively connecting said shafts to rotate the driven shaft, the sun-gear of the lower helical gearing being mounted on the driven shaft and supported against axial movement by the drive shaft and rotated thereby, a retainer-washer, a snap-ring on the driven shaft for holding the retainer-washer in engagement with said sun-gear, a shoulder on the driven shaft, a thrust-washer below said shoulder and supported by said snap-ring, and means for maintaining the retainer-washer and the thrust-washer against rotation independent of the driven shaft.

7. In a helicopter driving gear, a casing having a drive shaft bearing and a driven shaft bearing coaxial with and spaced upwardly from the drive shaft bearing, said casing also having an upwardly extending re-entrant portion about the drive shaft bearing, a drive shaft having an upper end portion within the casing and a portion extending downwardly into journalled relation with said drive shaft bearing, a driven shaft journalled in the driven shaft bearing and having a lower end portion piloted in the upper end portion of the drive shaft, said driven shaft also having a rotatable part portion disposed in the casing between the driven shaft bearing and said lower end portion, means for driving the driven shaft from the drive shaft comprising a sun gear journalled on the driven shaft bearing portion, a planet gear carrier on the driven shaft bearing portion, a ring gear fixed to said casing, planet gears journalled upon said carrier and mutually meshed with the sun and ring gears, means drivingly connecting the carrier with the driven shaft and an overrunning clutch unit disposed in driving relation between the upper end of the drive shaft and said sun gear, a steering rotor drive shaft journalled in said casing and directed radially with respect to the drive and driven shafts, and means for driving said steering rotor drive shaft comprising a bevelled gear journalled on said re-entrant portion of the casing coaxially with the drive and driven shafts and connected for rotation with said carrier, and a bevelled pinion upon said steering rotor drive shaft meshed with said bevelled gear.

WILLIAM L. SHEPPARD.

REFERENCES CITED

The following references are of record in the file of this patent:

UNITED STATES PATENTS

| Number | Name | Date |
|---|---|---|
| 986,588 | O'Kelley | Mar. 14, 1911 |
| 1,273,950 | Teltzrow | July 30, 1918 |
| 1,320,530 | Beuhler | Nov. 4, 1919 |
| 1,350,822 | McNitt | Aug. 24, 1920 |
| 1,820,061 | Flagg | Aug. 25, 1931 |
| 1,850,340 | Cowles | Mar. 22, 1932 |
| 1,882,383 | Hallitt | Oct. 11, 1932 |
| 1,945,361 | Ball | Jan. 30, 1934 |
| 1,960,141 | D'Ascanio | May 22, 1934 |
| 1,977,943 | Gianini | Oct. 23, 1934 |
| 2,085,814 | Matthews | July 6, 1937 |
| 2,156,603 | Nardone | May 2, 1939 |
| 2,256,754 | Schmitter | Sept. 23, 1941 |
| 2,269,916 | Price | Jan. 13, 1942 |
| 2,271,640 | Heintz | Feb. 3, 1942 |
| 2,318,259 | Sikorsky | May 4, 1943 |
| 2,333,161 | Dunn | Nov. 2, 1943 |